(12) United States Patent
Zylberstein et al.

(10) Patent No.: US 10,215,215 B2
(45) Date of Patent: Feb. 26, 2019

(54) TOLERANCE ABSORBER SLEEVE AND ASSEMBLY

(71) Applicant: Ningbo Geely Automobile Research & Development Co., Ltd, Ningbo (CN)

(72) Inventors: Daniel Zylberstein, Gothenburg (SE); Oscar Tullberg, Hovas (SE); Tom Stoddart, Molndal (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 0 days.

(21) Appl. No.: 15/726,200

(22) Filed: Oct. 5, 2017

(65) Prior Publication Data

US 2018/0045239 A1  Feb. 15, 2018

Related U.S. Application Data

(63) Continuation of application No. PCT/EP2016/057602, filed on Apr. 7, 2016.

(30) Foreign Application Priority Data

Apr. 9, 2015 (SE) .................................... 15504251

(51) Int. Cl.
   *F16B 43/02*  (2006.01)
   *F16B 31/02*  (2006.01)
   (Continued)

(52) U.S. Cl.
   CPC ............ *F16B 31/02* (2013.01); *F16B 5/0233* (2013.01); *F16B 5/0258* (2013.01); *F16B 29/00* (2013.01)

(58) Field of Classification Search
   USPC ........................................................ 411/546
   See application file for complete search history.

(56) References Cited

U.S. PATENT DOCUMENTS 4,289,061 A * 9/1981 Emmett ................ F16B 5/0258
                                                        411/10
4,657,456 A * 4/1987 Anquetin .............. F16B 13/061
                                                        411/38
(Continued)

FOREIGN PATENT DOCUMENTS

CN     103359039 A    10/2013
DE     4300710 A1     7/1994
(Continued)

OTHER PUBLICATIONS

The PCT Search Report and Written Opinion dated May 27, 2016 for PCT application No. PCT/EP2016/057602, 11 pages.

*Primary Examiner* — Gary W Estremsky
(74) *Attorney, Agent, or Firm* — Lee & Hayes, P.C.

(57) ABSTRACT

Tolerance absorber sleeve (20) for fastening a first component (40) to a second component (30) within a predetermined tolerance range (D), wherein said sleeve (20) is made of a metallic material and comprises a wall (21) and a first axial end portion (26) and a second axial end portion (27). Said sleeve (20) is adapted to be arranged in a hole of said first component (40) and abutting said second component (30) at the second axial end portion (27), wherein said wall (21) of said sleeve (20) comprises at least one weakening zone (22) adapted to plastically deform upon axial compression of the sleeve (20), such that said wall (21) of said sleeve (20) forms a first radially outward projection (201) on a first side of said hole of said first component (40), and a second radially outward projection (202) on a second side of said hole of said first component (40), whereby said tolerance absorber sleeve (20) is adapted to hold said first component (40) by said first and second projections (201, 202) within a predetermined tolerance range (D) from said second component (30).

16 Claims, 6 Drawing Sheets

(51) Int. Cl.
*F16B 5/02* (2006.01)
*F16B 29/00* (2006.01)

(56) References Cited

U.S. PATENT DOCUMENTS

| | | | | |
|---|---|---|---|---|
| 4,692,076 A | * | 9/1987 | Herb | F16B 13/00 411/55 |
| 5,191,991 A | * | 3/1993 | Jackson | F16K 17/14 174/11 R |
| 5,632,507 A | | 5/1997 | Sinner et al. | |
| 6,705,804 B2 | * | 3/2004 | Dierker | E21D 20/025 405/259.5 |
| 6,719,509 B1 | * | 4/2004 | Huang | F16B 13/025 411/32 |
| 6,776,566 B2 | * | 8/2004 | Kobusch | F16B 5/0283 411/432 |
| 7,901,171 B2 | * | 3/2011 | Schruff | F16B 37/067 411/38 |
| 8,157,833 B2 | * | 4/2012 | Au | A61B 17/34 606/105 |
| 8,961,087 B2 | * | 2/2015 | Schruff | F16B 19/1036 411/183 |
| 9,039,287 B2 | * | 5/2015 | Frenznick | F16C 35/06 384/551 |
| 9,689,418 B2 | * | 6/2017 | Schumacher | F16B 33/008 |
| 2005/0200109 A1 | | 9/2005 | Penner et al. | |
| 2008/0157483 A1 | * | 7/2008 | Booher | F16B 5/02 277/593 |

FOREIGN PATENT DOCUMENTS

| | | |
|---|---|---|
| DE | 19502226 C1 | 5/1996 |
| DE | 202007008643 U1 | 9/2007 |
| EP | 1295760 A2 | 3/2003 |
| JP | 401070657 A | 9/2002 |
| JP | 200983739 A | 10/2010 |
| WO | WO2006011308 A1 | 2/2006 |

* cited by examiner

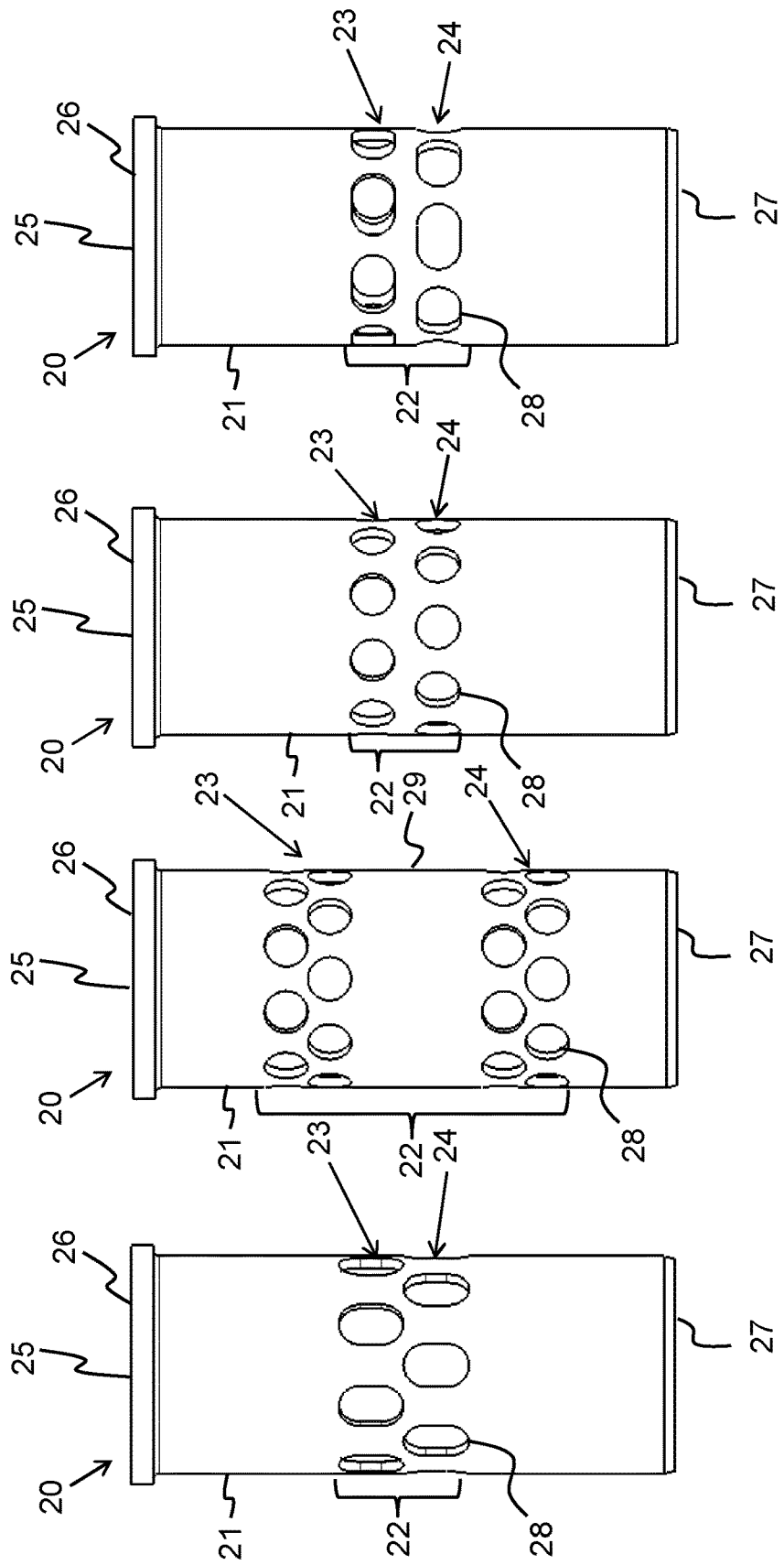

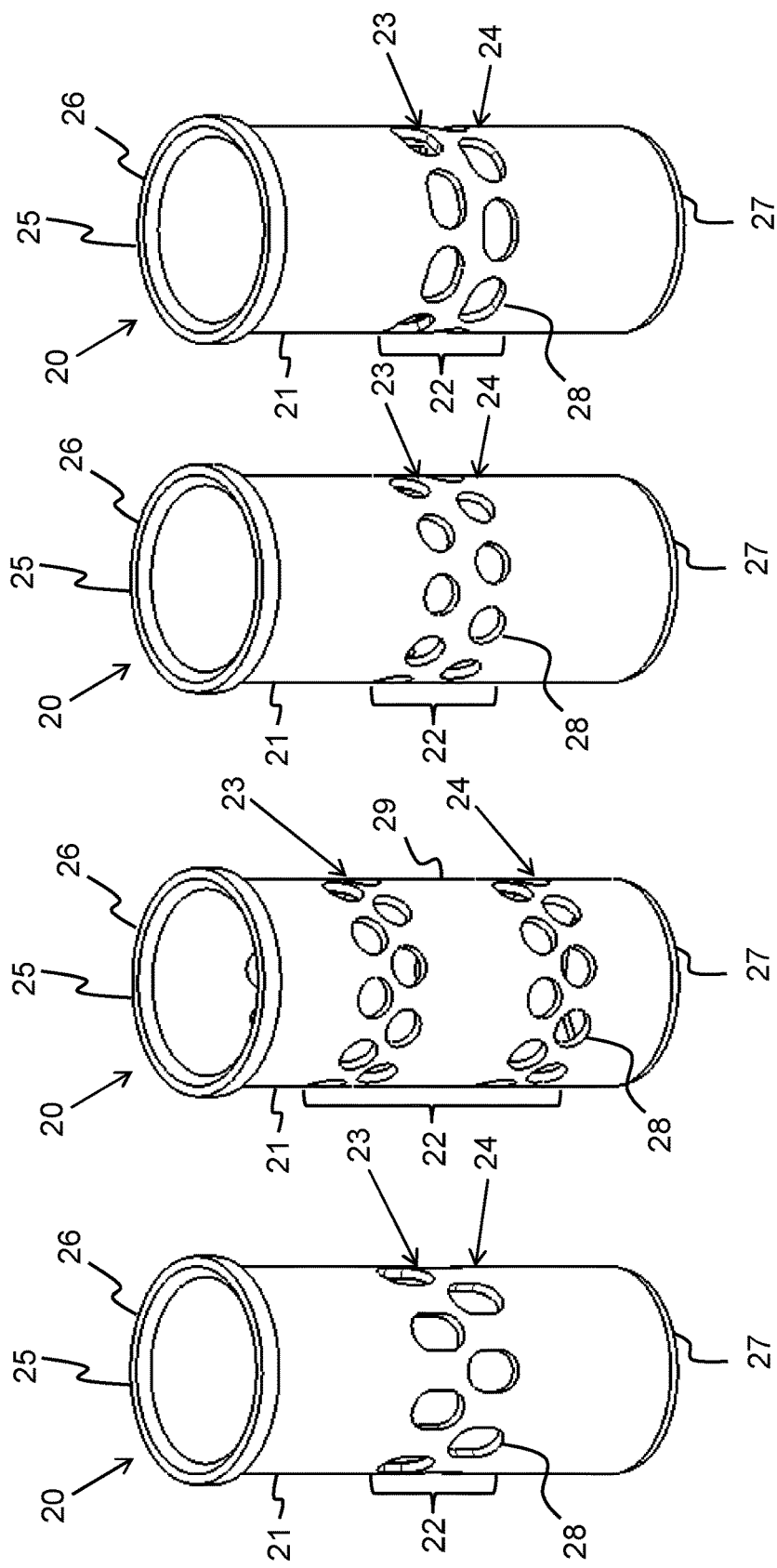

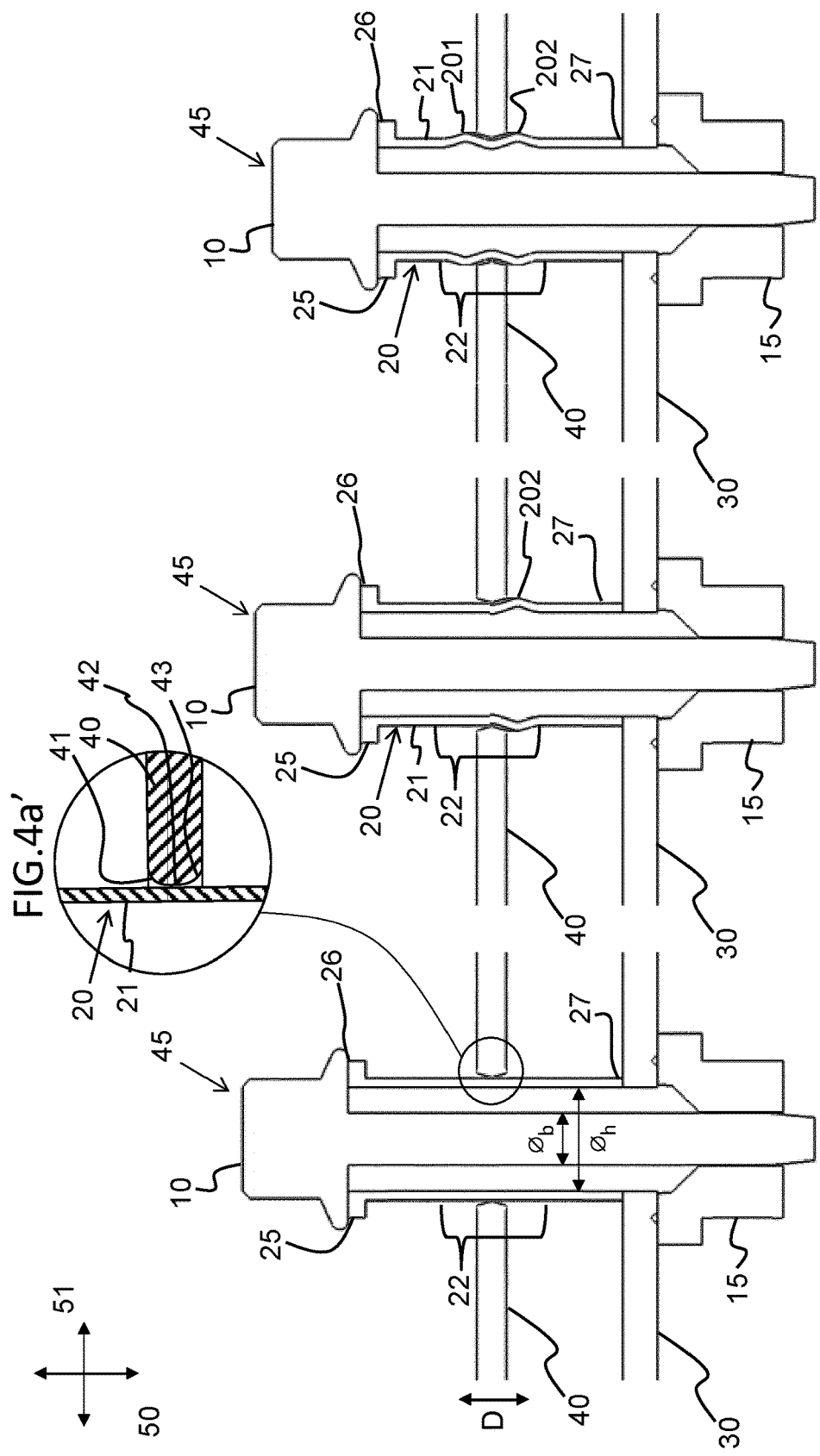

TOLERANCE ABSORBER SLEEVE AND ASSEMBLY

RELATED APPLICATION

This application is a continuation of PCT International Application No. PCT/EP2016/057602, filed Apr. 7, 2016, which claims foreign priority to Sweden Application No. SE 1550425-1, filed on Apr. 9, 2015, both of which are incorporated herein by reference.

TECHNICAL FIELD

Example embodiments presented herein are directed towards a tolerance absorber sleeve for fastening a first component to a second component. Example embodiments are also directed towards a tolerance absorber assembly. Example embodiments are also directed towards a vehicle comprising such sleeves or assemblies as well as corresponding methods.

BACKGROUND

When fastening two components to each other in certain industries, such as e.g. the vehicle industry, it can sometimes be desirable to have these two components arranged at a distance. This allows for additional play between the components and reduces wear from friction between them. This is especially important when mounting e.g. headlamps to the vehicle or when mounting interior components such as the instrument panel to the body of the vehicle. This also allows mounting of the components to be more flexible, as there is a certain range within which the components may be mounted. This allows lower requirements on tolerance on the structural dimensions of components being mounted.

This range is commonly referred to as a tolerance range, i.e. a range of tolerance within which it is desirable to keep the components after fastening. This is achieved using equipment called tolerance absorbers. Tolerance absorbers are used to keep the two components within the desired tolerance range. Some tolerance absorbers of conventional design include a detail on a threaded section of a bolt arranged to prevent the bolt from being screwed in into the body of the vehicle.

A type of tolerance absorber is shown in DE202007008643 U1. In this tolerance absorber, two parts, screwable at opposing directions, are used to control the distance between the two components.

Another type of tolerance absorber is shown in DE4300710A, in which an elastic sleeved deformation piece is arranged around a threaded sleeve, which is secured in one of the components. As long as the threaded sleeve is pressed together by being screwed in, the elastic sleeved deformation piece is deformed to hold the other component, thus keeping the components held together.

While the solutions found in the prior art work well in some situations, there is still room for an improved tolerance absorber.

SUMMARY

An object of this disclosure is to provide a tolerance absorber sleeve for fastening a first component to a second component within a predetermined tolerance range. Another object of this disclosure is to provide a tolerance absorber assembly in which a first component is fastened to a second component using a tolerance absorber sleeve. A further object of this disclosure is to provide a vehicle comprising such a tolerance absorber sleeve or tolerance absorber assembly. A further yet object of this disclosure is to provide a method for fastening a first component to a second component using a tolerance absorber sleeve and a threaded member.

An object of the disclosure is achieved by a tolerance absorber sleeve according to the claims. In a tolerance absorber sleeve for fastening a first component to a second component within a predetermined tolerance range D, said sleeve is made of a metallic material and comprises a wall and a first axial end portion and a second axial end portion. Said sleeve is adapted to be arranged in a hole of said first component and abutting said second component at the second axial end portion. Said wall of said sleeve comprises at least one weakening zone adapted to plastically deform upon axial compression of the sleeve, such that said wall of said sleeve forms a first radially outward projection on a first side of said hole of said first component, and a second radially outward projection on a second side of said hole of said first component, whereby said tolerance absorber sleeve is adapted to hold said first component by said first and second projections within a predetermined tolerance range D from said second component.

An example advantage of the tolerance absorber sleeve is that the first component can be fastened to the second component at a predetermined tolerance range with commonly used bolts, nuts and studs, as long as the threaded portion of the bolt or stud can fit inside the sleeve. As the sleeve itself is quite simple to manufacture, this fact in combination with the fact that common fastening members or threaded fasteners may be used means that manufacturing costs are low. A further example advantage is that the installation of the sleeve is simple, which reduces errors and speeds up assembly. A further yet advantage is that the sleeve can be made with a large span of tolerance ranges applicable to said sleeve, as the projections are formed on both sides of the holes, this means that such a sleeve can be used for different tolerance ranges, while still keeping the first component within the predetermined one. Further yet, if the sleeve is made with a smaller span of tolerance ranges, and a plurality of sleeves are provided, it becomes apparent to a used that the incorrect tolerance range is being employed, reducing the amount of errors in production. A further yet advantage of the tolerance absorber sleeve is that the sleeve allows for some play in a plane perpendicular to the axial extension of the sleeve, whereby the sleeve can allow the first component to move slightly in this plane while still being held within the predetermined tolerance range from the second component.

According to some of the example embodiments, the weakening zone extends along a circumference of said sleeve, and comprises at least one perforation, at least one area with a reduced wall thickness or at least one area with a reduced material yield strength. Each of these methods of producing a weakness comes with different costs and strengths, whereby the one most suitable for the application at hand may be chosen.

In other words, in one example embodiment, the weakening zone comprises at least one perforation. In one design variant, the weakening zone comprises at least one area with a reduced wall thickness. In one design variant, the weakening zone comprises at least one area with a reduced material yield strength.

It is also conceivable, that the weakening zone may comprise any type of combination of at least one perforation, at least one area with a reduced wall thickness and at least one area with a reduced material yield strength.

According to some of the example embodiments, the weakening zone comprises a first and a second weakening region, wherein said first and second weakening regions are arranged at different locations along an axial extension of said tolerance absorber sleeve. The weakening zone has a first axial deformation resistance in the first weakening region, and a second axial deformation resistance in the second weakening region, wherein said first axial deformation resistance is higher than the second axial deformation resistance. An example advantage thereof is that one of the first and second radially outward projections is formed before the other, as each region has a different deformation resistance. It is to be noted that the projection which is intended to be firstly formed may be chosen depending on the way the first and second components are positioned. However, having the projection on which the first component will rest on formed first allows a tight hold of the component to be formed more easily. However, in most situations, in order for the first component to not move in the axial direction during assembly, the deformation resistance in the weakening region closer to the second component in the axial direction, i.e. the second weakening region is lower. This causes the second radially outward projection to form first, which prohibits the first component from moving past the weakening zone in the direction towards the second component.

According to some of the example embodiments, the weakening zone has a first axial deformation resistance in the first weakening region, and a second axial deformation resistance in the second weakening region, wherein said first axial deformation resistance is equal to the second axial deformation resistance.

According to some of the example embodiments, the weakening regions are separated by a rigid region, wherein said rigid region has an axial deformation resistance greater than that of each of the first and second weakening regions. An example advantage thereof is that the first and second projections will be spaced apart, which allows e.g. for greater play of the first component in the axial direction or a component with a larger thickness to be held by the projections.

In some design variants, the weakening zone comprises a single weakening region.

According to some of the example embodiments, the tolerance absorber sleeve comprises an abutment flange at the second axial end portion and a securing section, wherein said securing section extends axially from said abutment flange, and wherein said securing section is configured to act as a blind rivet. An example advantage thereof is that the sleeve can be secured to the second component without the need for a nut, as the sleeve itself acts as a blind rivet. The sleeve can then be fastened using a bolt, which may be removed after the blind rivet functionality has been activated, preferably after also axially compressing the sleeve to form the first and second radially outward projections. The bolt may also remain for additional structural support. The sleeve is thereby secured to the first and second components. In some example embodiments, the securing section comprises a further weakening zone and a threaded section on the interior surface of said securing section, wherein said threaded section is adapted to be engaged by a threaded member and subsequently pulled towards the second component, whereby said sleeve is partially deformed forming a third radially outward projection, such that the sleeve is secured to the second component by means of the abutment flange and said third radially outward projection. Example advantages of this include the ability of the sleeve to be secured to the second component which is held between the third projection and the abutment flange when installed.

Another object of the disclosure is achieved by a tolerance absorber assembly according to the claims. The tolerance absorber assembly comprises a tolerance absorber sleeve and a first and second component, wherein said sleeve is made of a metallic material and comprises a wall and a first axial end portion and a second axial end portion and said wall comprises at least one weakening zone. The tolerance absorber sleeve is arranged in a hole of said first component and abutting said second component at said second axial end portion of the sleeve, and the weakening zone comprises a first radially outward projection on a first side of said first component and a second radially outward projection on a second side of said first component. Said first and second radially outward projections are formed by plastic deformation of said weakening zone, wherein said first and second radially outward projections hold said first component within a predetermined tolerance range D from said second component. In some example embodiments, the tolerance absorber sleeve of the tolerance absorber assembly comprises features of the embodiments of tolerance absorber sleeves described in the disclosure, with similar effects thereof contributed to the assembly as a whole.

According to some example embodiments, the tolerance absorber assembly comprises a threaded fastener, wherein said threaded fastener comprises a bolt which is threadingly engaged with a threaded opening on the second component or with a nut located on the opposite side of the second component, whereby the tolerance absorber sleeve is fastened to the second component by said threaded fastener. According to some example embodiments, the threaded fastener comprises a nut which is threadingly engaged with a threaded stud arranged on the second component, whereby the tolerance absorber sleeve is fastened to the second component by said threaded fastener. Example advantages thereof include the ability of the assembly to be fastened or secured to the second component by a variety of threaded fasteners.

According to some example embodiments, the threaded fastener is a bolt, and a shaft of said bolt has an outer dimension essentially equal to the smallest inner dimension of the tolerance absorber sleeve. An example advantage thereof is that the forming of the radially outward projections in an outward direction is promoted. This since projection inwardly is now blocked by the shaft of the bolt.

According to some of the example embodiments, the tolerance absorber assembly comprises an abutment flange at the second axial end portion of the sleeve abutting the second component, and a securing section, wherein the second component comprises a through-hole, and wherein the securing section extends axially from the abutment flange through the through-hole and is configured to act as a blind rivet.

According to some of the example embodiments of the tolerance absorber assembly, the first component is held tightly by the first and second radially outward projections.

According to some of the example embodiments, the hole of the first component has a cross section substantially corresponding to the cross section of the tolerance absorber sleeve at the weakening zone. An example advantage thereof is that the first and second radially outward projections are formed on both sides of said cross section of the hole when the cross section is arranged within the weakening zone.

According to some of the example embodiments, the hole of the first component has an inner circumferential surface which is beveled, convex or tapered. An example advantage thereof is that the forming of the first and second radially outward projections on opposing sides of the first component is promoted. This also allows the dimensions of a cross section of the hole to be smaller in one part, and larger in another, whereby the locations of the first and second radially outward projections can be controlled in part by the shape of the hole.

A further object of the disclosure is achieved by a vehicle according to the claims. An example embodiment of the vehicle comprises a tolerance absorber sleeve according to the disclosure. Another example embodiment of the vehicle comprises a tolerance absorber assembly according to the disclosure.

Typically, the vehicle also comprise a first component and a second component, wherein the tolerance absorber sleeve is configured for mounting the first and second components to each other but at a distance from each other.

A further yet object of the disclosure is achieved by a method according to the claims.

According to some example embodiments of the method for fastening a first component to a second component within a predetermined tolerance range D, the method using a tolerance absorber sleeve and a threaded member, wherein said tolerance absorber sleeve comprises a wall and a first and a second axial end portion, wherein said wall has a weakening zone arranged to plastically deform upon axial compression of said sleeve. Said method comprises the steps of: arranging said first and second components within a predetermined tolerance range D from each other, arranging said tolerance absorber sleeve in a hole of said first component and abutting said second component, securing said tolerance absorber sleeve to said second component using said threaded member, and compressing said tolerance absorber sleeve using said threaded member, whereby a first radially outward projection is formed on a first side of said hole of said first component, and a second radially outward projection is formed on a second side of said hole of said first component.

BRIEF DESCRIPTION OF THE DRAWINGS

The foregoing will be apparent from the following more particular description of the example embodiments, as illustrated in the accompanying figures in which like references characters refer to the same parts throughout the different views. The figures are not necessarily to scale, emphasis instead being placed upon illustrating the example embodiments through schematic figures.

FIGS. 1a-d show a side view of a plurality of tolerance absorber sleeves,

FIGS. 2a-d show a perspective view of a plurality of tolerance absorber sleeves, FIGS. 4a-c show a longitudinal cut view of a progression of a first component being fastened to a second component.

DETAILED DESCRIPTION

Figure 3B:
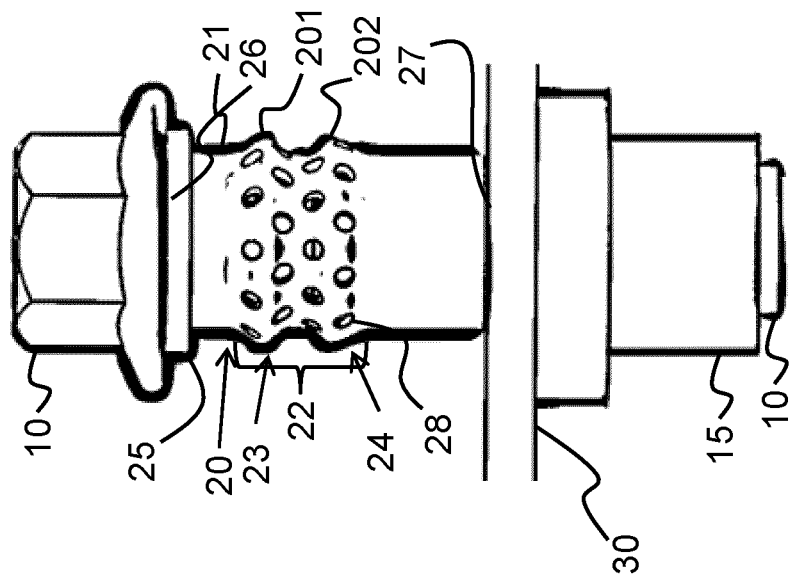
FIGS. 3a-b show side views of tolerance absorber sleeve being fastened to a component.

The figures show a tolerance absorber sleeve 20 for fastening a first component 40 to a second component 30 at a predetermined distance D or a tolerance absorber assembly 45 comprising a first component 40, a second component 30 and a tolerance absorber sleeve 20.

FIG. 1a shows a side view of an example embodiment of the tolerance absorber sleeve 20. The tolerance absorber sleeve 20 is made out of a metallic material. The tolerance absorber sleeve 20 comprises a wall 21, and a first axial end portion 26 and a second axial end portion 27. The tolerance absorber sleeve 20 comprises a flange 25 located at the first axial end portion 26, said flange 25 extending radially outward from the wall 21 of the sleeve 20.

The tolerance absorber sleeve 20 comprises a weakening zone 22. The weakening zone 22 extends along a circumference of the sleeve 20. In this example, the weakening zone 22 comprises a first and a second weakening region 23, 24 arranged at two different locations along the axial extension of the sleeve 20.

Further, in this example, the weakening zone 22 comprises a plurality of perforations 28. The perforations 28 are arranged in rows along the circumference of the sleeve, one row of perforations 28 in each weakening region 23, 24. The perforations 28 are evenly spaced along the circumference of the sleeve 20. The perforations 28 are arranged at an offset from the perforations 28 in the axially adjacent row. The weakening zone 22 is adapted to plastically deform upon axial compression of the sleeve 20. Said plastic deformation occurs only noticeably in the weakening zone 22 thanks to the perforations 28, while the remaining parts of the wall 21 of the sleeve 20 are rigid zones, which substantially resist deformation. The sleeve 20 may be compressed by a plurality of different manners, but one example manner is to compress it between a threaded fastener such as a bolt or a nut, and the second component 30.

The deformation is a plastic deformation in order to ensure that the sleeve 20 can be reliably secured to the first component 40. This also means that the hold has a longer lifespan, which is beneficial for e.g. vehicles which are designed to last many years.

The perforations 28 are oval shaped and have a greater extension along the axial extension of the sleeve 20 compared to the extension of the perforations 28 along the circumference of the sleeve 20.

The weakening zone 22 has a first axial deformation resistance in the first weakening region 23 and a second axial deformation resistance in the second weakening region 24, i.e. the force required for the region 23, 24 to deform. The first axial deformation resistance is higher than the second axial deformation resistance, whereby when the sleeve 20 is axially compressed, the second weakening region 24 will deform before the first weakening region 23. FIG. 2a shows a perspective view of the tolerance absorber sleeve 20 of FIG. 1a.

FIG. 1b shows a side view another example embodiment of the tolerance absorber sleeve 20. In the sleeve 20 of FIG. 1b, the weakening zone 22 comprises a rigid region 29, which separates the first and second weakening regions 23, 24. The rigid region 29 has an axial deformation resistance which is greater than that of the first and second weakening regions 23, 24. During axial compression of the sleeve 20, the rigid region 29 resists axial compression, whereby the first and second weakening regions 23, 24 are distanced from each other.

Each of the weakening regions 23, 24 comprises two rows of perforations 28, each row of perforations 28 arranged at an offset from the other in the circumferential direction. The perforations shown in FIG. 1b are substantially circular in their shape. FIG. 2b shows a perspective view of the tolerance absorber sleeve 20 of FIG. 1b.

FIG. 1c shows a side view of an example embodiment of the tolerance absorber sleeve 20 similar to the one shown in FIG. 1a. In the sleeve of FIG. 1c, the perforations 28 are substantially circular. FIG. 2c shows a perspective view of the tolerance absorber sleeve 20 of FIG. 1c.

FIG. 1d shows a side view of an example embodiment of the tolerance absorber sleeve 20 similar to the one shown in FIG. 1a. In the figure of sleeve 1d, the perforations 28 are oval shaped and have a greater extension along the circumference of the sleeve 20 compared to the extension of the perforation in the axial extension of the sleeve 20. FIG. 2d shows a perspective view of a similar tolerance absorber sleeve 20.

The perforations shown are circular or oval, but triangular, hexagonal or square perforations can also be used. The perforations may also be formed by longer more continuous cut-outs, especially H-shaped perforations.

The perforations 28 of the first weakening region 23 may have a smaller size than the perforations 28 of the second weakening region 24 for providing the desired lower axial deformation resistance in the second weakening region 24 compared with the first weakening region 23. Alternatively, or in combination with above, the may be fewer perforations 28 in the first weakening region 23 than the second weakening region 24 for providing the desired lower axial deformation resistance in the second weakening region 24 compared with the first weakening region 23. Still more alternatively, or in combination with above, the shape and/or orientation of the perforations 28 in the first weakening region 23 may differ from the shape and/or orientation of the perforations 28 in the second weakening region 24 for providing the desired lower axial deformation resistance in the second weakening region 24 compared with the first weakening region 23.

Instead of perforations, the weakening zones may be formed by other means. For instance, the desired weakening effect may be achieved by reducing the thickness of the wall at some locations, which may be achieved by e.g. laser sintering. Another option is to have a reduced material yield strength. The reduced material yield strength may be achieved by e.g. mechanical and/or thermal treatment. A combination of several of these perforations or means may be used.

Furthermore, it is to be noted that although the above example embodiment has been described in conjunction with a weakening zone comprising first and second weakening regions, other options are also conceivable. As an example, although not shown in the figures, the weakening zone may simple be provided by one weakening region. In other words, in some design variants, the wall of the sleeve comprises at least one weakening zone adapted to plastically deform upon axial compression of the sleeve such that the wall of the sleeve forms a first radially outward projection on a first side of the hole of the first component 40, and a second radially outward projection 202 on a second side of the hole of the first component 40. Hereby, the tolerance absorber sleeve 20 is adapted to hold the first component 40 by the first and second projections 201, 202 within a predetermined tolerance range D from the second component 30. Thus, the example embodiments of the tolerance absorber sleeve may also be realised by a weakening zone having one single weakening region.

While the figures show the weakening zone extend along the circumference, the zone may also stretch along the circumference in a diagonal manner, which may allow the sleeve to be used with a diagonal hole in the first component.

The sleeve shown is circular in its cross section, but more hexagonal cross sections may also be imaginable.

Figure 3A:
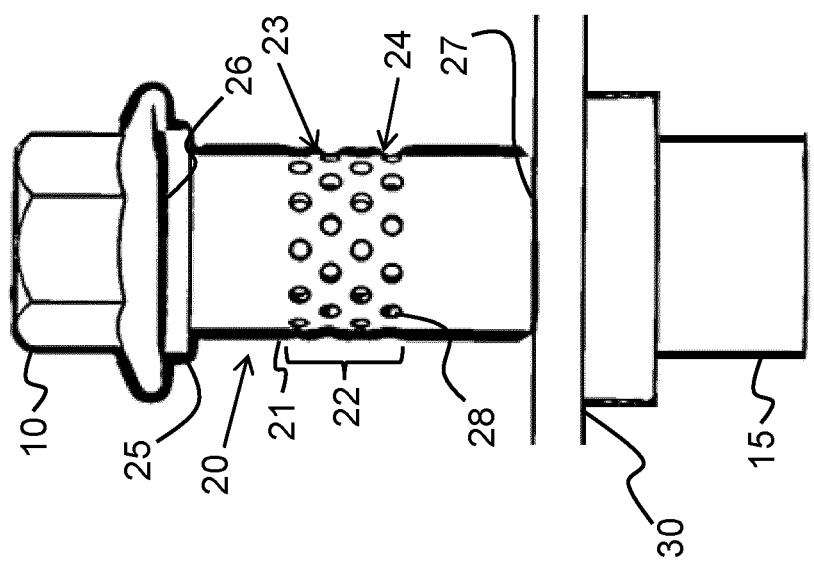

FIG. 3a shows a side view of an example embodiment of the tolerance absorber sleeve 20. FIG. 3a also shows the example embodiment of the tolerance absorber sleeve 20 being fastened to the second component 30. The tolerance absorber sleeve 20 is adapted to fasten the first component (not shown in FIGS. 3a-b) to a second component 30. The tolerance absorber sleeve 20 is similar to the tolerance absorber sleeves shown in FIGS. 1 and 2. In the tolerance absorber sleeve shown in FIG. 3a, each of the two weakening regions 23, 24 comprises two rows of circular perforations 28, where the perforations 28 of each row are arranged at an offset in the circumferential direction from the perforations 28 of adjacent rows.

The tolerance absorber sleeve 20 is arranged abutting the second component 30, and is fastened to the second component 30 by means of a bolt 10 and a nut 15, said bolt abutting the flange 25 and extending through the sleeve 20 through an opening in the second component 30.

FIG. 3b shows the tolerance absorber sleeve 20 of FIG. 3a after it has been axially compressed. The bolt 10 has been further threaded with the nut 15, and as a result, has compressed the tolerance absorber sleeve 20 in the axial direction 50. A first and a second radially outward projection 201, 202 are formed in the weakening zone 22 by the axial compression of the sleeve 20.

Each of the first and second radially outward projections 201, 202, extend along the circumference of the sleeve 20, and project outward such that the cross section of the sleeve 20 has a greater diameter in the radially outward projections 201, 202 than in other parts of the wall 21. As a result of the axial compression of the sleeve 20, the length of the sleeve in the axial direction 50 has decreased.

The tolerance absorber sleeve 20 is adapted to hold, by first and second radially outward projections 201, 202, a first component (not shown). Since the projections 201, 202 are formed by plastic deformation, the hold on a first component is secured. As the sleeve 20 is secured to the second component 30 by the bolt 10 and nut 15, the first component is thereby held within a predetermined tolerance range D from the second component 30.

The nut 15 can be either a regular nut 15 or a weld nut 15 welded to the second component 30. While FIG. 3b shows a nut 15 being used to thread the bolt 10 to secure the sleeve 20 to the second component 30, the bolt may instead be threaded with threads on the internal surface of the hole in the second component 30.

In the example embodiment of FIGS. 3a-b, a bolt is used as a threaded member to secure the sleeve 20 to the second component 30. Another manner in which the sleeve 20 may be secured is by using a threaded stud such as e.g. a weld stud on the second component 30. In this situation the bolt and nut would then be replaced by the stud and a nut, whereby the sleeve is axially compressed by sufficient threading of a nut on the stud when the sleeve 20 is arranged abutting the second component 30 with the stud extending inside the sleeve 20.

FIG. 4a-c show longitudinally cut views of an example embodiment of the tolerance absorber assembly 45 being assembled at different stages of axial compression. The assembly 45 comprises a tolerance absorber sleeve 20, and a first component 40 and a second component 30. The tolerance absorber sleeve 20 shown in the tolerance absorber assembly 45 of FIG. 4a-c is similar to the tolerance absorber sleeve 20 shown in FIG. 3a.

The first component 40 and the second component 30 both comprise a through-hole. The hole of the first component 40 is slightly larger in diameter than the outer diameter of the sleeve 20. The inner circumferential surface 41 of the hole of the first component 40 has a slight bevel on both sides of the first component 40. Thereby, the hole of the first component 40 has smaller dimensions at the middle 42 of the inner circumferential surface than nearer the sides 43. The cross section of the hole of the first component 40 at the middle 42 substantially corresponds to the cross section of the tolerance absorber sleeve 20 at the weakening zone 22.

A weld nut 15 is fixed to the opposite side of the second component 30, arranged at the opening. The tolerance absorber sleeve 20 is arranged inside the hole of the first component 40, and abutting the second component 30. A bolt 10 is arranged with its head abutting the flange 25 of the sleeve 20, and the shaft of the bolt 10 extending through the sleeve 20, through the hole in the second component 30, and is threaded with threading on the weld nut 15.

The hole of the second component 30 is smaller in diameter than the tolerance absorber sleeve 20.

When a sleeve with inner diameter $ø_h$ is fixed by a bolt, wherein said bolt has a shaft with a diameter of $ø_b$, a certain amount of play exists in a direction 51 perpendicular to the axial direction 50 of the sleeve, equal to the difference between $ø_h$ and $ø_b$.

FIG. 4a shows a first step in the process of fastening the first component 40 to the second component 30. The first and second components 40, 30 are arranged within a predetermined tolerance range from each other. This may be done before arranging the tolerance absorber sleeve 20 and securing the sleeve 20 to the second component using the bolt 10 or afterwards.

FIG. 4a' shows a zoomed in view of a part of FIG. 4a. In FIG. 4a' the inner circumferential surface 41 of the hole of the first component 40 has a concave surface, with a smaller diameter at the middle 42 of the inner circumferential surface of the hole, and a slightly larger diameter at the sides 43 of the inner circumferential surface of the hole.

FIG. 4b shows a second step in the process of fastening the first component 40 to the second component 30. The tolerance absorber sleeve 20 has been compressed by the bolt 10 being further threaded with the nut 15. The second radially outward projection 202 is formed on the side of the first component 40 facing the second component 30.

Because the second axial deformation resistance, the axial deformation resistance of the weakening zone 22 in the second weakening region 24, is lower than the first axial deformation resistance, the axial deformation resistance of the weakening zone in the first weakening region 23, the second radially outward projection 202 is formed in the second weakening region 24 before one is formed in the first weakening region 23. In the situation shown in FIG. 4b, the axial compression of the sleeve has provided enough axial compression to overcome the second deformation resistance, the deformation resistance of the second weakening region 24, whereby only the second radially outward projection 202 is formed. By forming the second radially outward projection 202 before the first radially outward projection 201, it is ensured that the first component 40 does not accidently slip past the weakening zone towards the second component 30.

FIG. 4c shows a third step in the process of fastening the first component 40 to the second component 30. The tolerance absorber sleeve 20 has been further compressed by the bolt 10 which has been further threaded with the nut 15. Thereby, the first radially outward projection 201 is formed on the side of the first component 40 not facing the second component 30.

As the dimensions of the radially outward projections 201, 202 at their greatest radial extension are greater than the dimensions of the hole of the first component 40 at their smallest, the first component is held between the first and second radially outward projections 201, 202. Since the sleeve 20 is secured to the second component 30, the first component 40 is thereby fastened to the second component 30.

Depending on the goal with the use of the sleeve, different dimensions of the sleeve can be imagined. If the first component is to have very little play in the axial direction 50 of the sleeve, it is desirable for the projections to hold the first component tightly. This can be achieved e.g. by having a slightly smaller diameter of the sleeve.

Figure 5A:
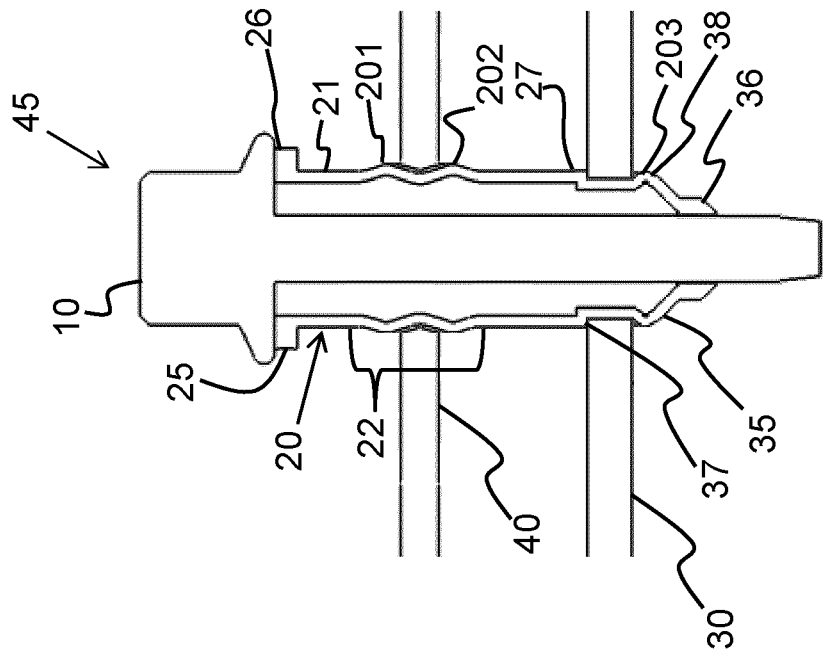
FIGS. 5a-b show a longitudinal cut view of a progression of a first component being fastened to a second component.
Figure 5B:
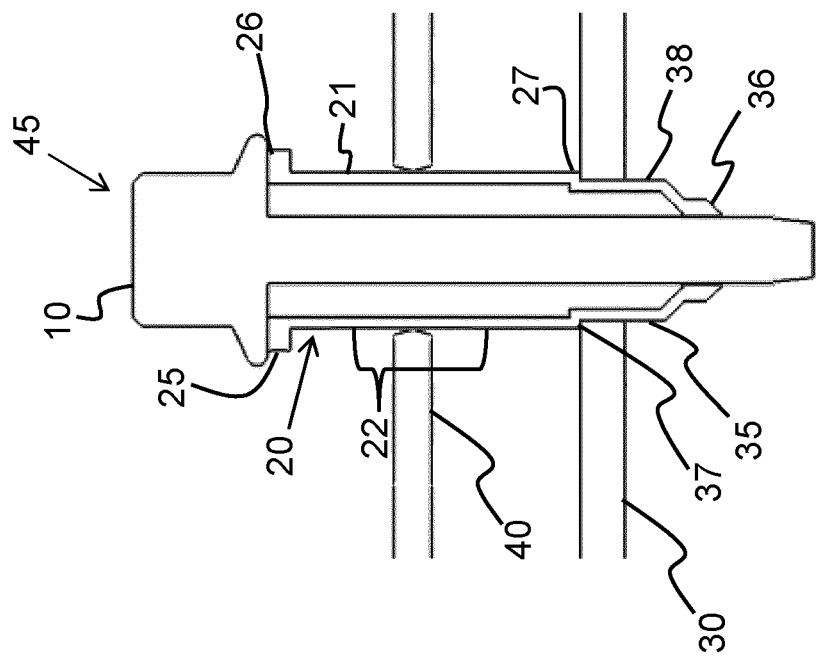

FIGS. 5a-5b show an example embodiment of the tolerance absorber assembly 45 being assembled with a tolerance absorber sleeve 20 with a rivet nut functionality. The assembly 45 comprises the tolerance absorber sleeve 20, and the first component 40 and the second component 30. The tolerance absorber sleeve 20 is similar to the sleeve 20 shown in FIG. 3, with additional features.

The tolerance absorber sleeve 20 comprises an abutment flange 37 at the second axial end portion 27. The sleeve 20 also comprises a securing section 35 which extends axially from the abutment flange 37 through the hole in the second component and is configured to act as a blind rivet. In FIGS. 4a and 4b, the sleeve 20 has a narrower cross section in the securing section 35, which forms the abutment flange 37. However, the abutment flange 37 could also be formed by a flange extending outwards in the radial direction of the sleeve 20, this would allow the securing section 35 to have a cross section with the same width as the wall 21 of the sleeve 20. The securing section 35 narrows to a threaded section 36 which comprises threads on the internal surface thereof, which will engage with a bolt 10 when securing the sleeve 20 to the second component 30.

The securing section 35 also has a further weakening zone 38 which is arranged to form a third radially outward projection 203 when the threaded section 36 is pulled towards the second component 30 by threading of the bolt sufficiently into the sleeve 20. The third radially outward projection 203 will secure the sleeve to the second component 30, in the same manner as a blind rivet would.

The further weakening zone 38 has a third axial deformation resistance which is lower than the first and the second deformation resistances. Thereby, the third radially outward projection 203 is formed before the first and second radially outward projections 201, 202. This will ensure that the sleeve 20 is secured to the second component 30 before the first and second radially outward projections 201, 202 are formed to hold the first component 40. However, should the reverse be desirable, i.e. that the hold on the first component 40 is achieved before securing to the second component 30, a sleeve 20 with the third axial deformation resistance being higher than the first or the second could be produced.

In FIG. 5a, the arrangement 45 is shown with the sleeve 20 arranged in the hole of the first component 40, and abutting the second component 30 by the abutment flange 37. The bolt 10 has been threaded into the sleeve, but the sleeve 20 has not yet had its radially outward projections formed.

In FIG. 5b, the arrangement 45 shown is that of FIG. 5a, after the bolt 10 has been further threaded into the sleeve 20. The third radially outward projection 203 is formed in the further weakening zone 38 of the securing section. The sleeve 20 is secured to the second component 30 by the abutment flange and the third radially outward projection 203.

Figure 6:
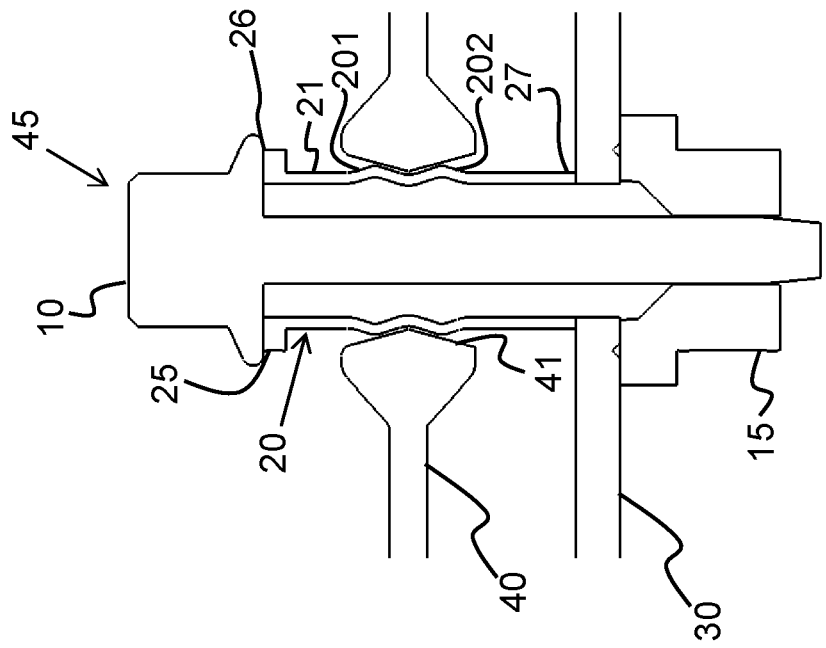
FIG. 6 shows a longitudinal cut view of a tolerance absorber assembly.

FIG. 6 shows an example embodiment of a tolerance absorber assembly 45 similar to the one shown in FIG. 3c. In FIG. 6, the shaft of the bolt 10 has a diameter $\varnothing_b$ which is essentially equal to the smallest inner diameter $\varnothing_h$ of the sleeve 20. Thereby, when the sleeve 20 is compressed in the axial direction 50 by the bolt 10 being threaded with the nut 15, there is a reduced chance for the projections 201, 202 to accidently be formed in a radially inward direction of the sleeve 20, promoting instead outward direction of the projections 201, 202.

Figure 7:
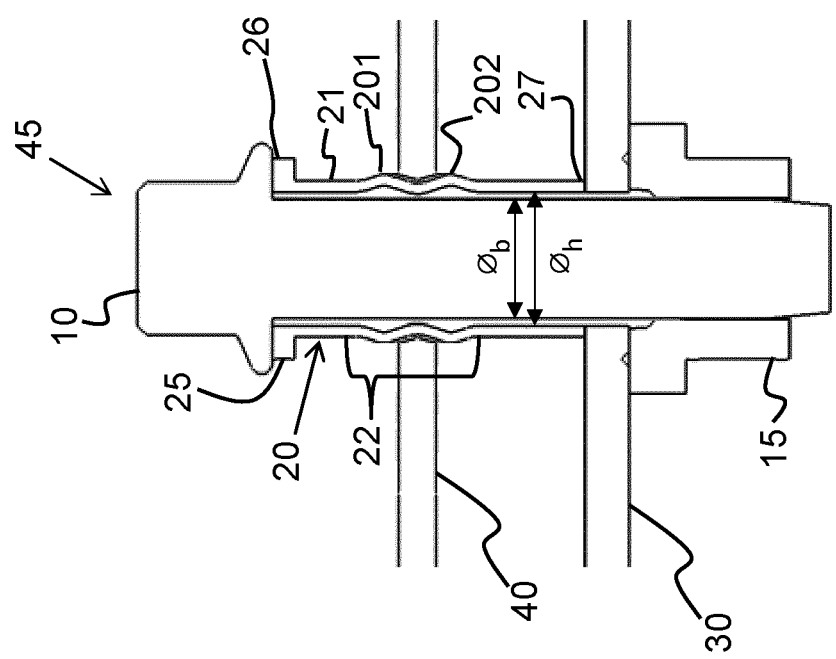
FIG. 7 shows a longitudinal cut view of a tolerance absorber assembly.

FIG. 7 shows an example embodiment of a tolerance absorber assembly 45 similar to the one shown in FIG. 3c. In FIG. 7 however, the wall thickness adjacent the hole of the first component 40 is increased, with the beveled parts extending beyond the general thickness of the first component 40. The design of this example embodiment of the first component 40 enables the first and second projections 201, 202 to be formed within the hole, such that the wall 21 of the sleeve during formation of the second projection 202 contacts the inner circumferential surface 41 of hole. Thereby, any force originating from the contact between the second projection and the first component 40 will have an orientation strongly deviating from the axial direction 50 of the sleeve, for example about 40-80 degrees inclined with respect to the axial direction 50. Such deviation in contact force orientation from the axial direction 50 provides a reduced risk that the first component 40 becomes deviated from its desired relative position due to contact force from the sleeve 20.

The inner surface may also have other surface profiles in order to achieve different desired results. The surface may be e.g. chamfered or tapered. The surface may also be convex with a smooth transition from the middle 42 of the inner surface to the sides 43, or concave relative the surface of the sleeve.

The tolerance absorber sleeve 20 and tolerance absorber assembly 45 is among other applications suitable for fastening instrument boards, dashboards or other vehicle details to a vehicle body. By way of example, the tolerance absorber sleeve 20 is used for mounting a first component of a vehicle to a second component of the vehicle so that these two components are arranged at a distance from each other.

REFERENCE LIST

10 Threaded member
15 Weld nut
20 Tolerance absorber sleeve
21 Wall
22 Weakening zone
23 First weakening region
24 Second weakening region
25 Flange
26 First axial end portion
27 Second axial end portion
28 Perforation
29 Rigid region
30 Second component
35 Securing section
36 Threaded section
37 Abutment flange
38 Further weakening zone
40 First component
41 Inner circumferential surface of hole
42 Middle of inner circumferential surface of hole
43 Side of inner circumferential surface of hole
45 Tolerance absorber assembly
50 Axial direction of sleeve
51 Direction perpendicular to the axial direction
201 First radially outward projection
202 Second radially outward projection
203 Third radially outward projection
$\varnothing_b$ Diameter of the shaft of the bolt
$\varnothing_h$ Inner diameter meter of the sleeve
D Tolerance range

What is claimed is:

1. A tolerance absorber sleeve for fastening a first component to a second component within a predetermined tolerance range (D), wherein said sleeve is made of a metallic material and comprises a wall and a first axial end portion and a second axial end portion, wherein said sleeve is adapted to be arranged in a hole of said first component and abutting said second component at the second axial end portion, wherein said wall of said sleeve comprises at least one weakening zone adapted to plastically deform upon axial compression of the sleeve, such that said wall of said sleeve forms a first radially outward projection on a first side of said hole of said first component, and a second radially outward projection on a second side of said hole of said first component, whereby said tolerance absorber sleeve is adapted to hold said first component by said first and second projections within the predetermined tolerance range (D) from said second component, wherein said weakening zone extends along a circumference of said sleeve, and wherein said weakening zone comprises at least one perforation, wherein the weakening zone comprises a first and a second weakening region, wherein said first and second weakening regions are arranged at different locations along an axial extension of said tolerance absorber sleeve, wherein the weakening zone has a first axial deformation resistance in the first weakening region, and a second axial deformation resistance in the second weakening region, wherein said first axial deformation resistance is higher than or equal to the second axial deformation resistance.

2. The tolerance absorber sleeve according to claim 1, wherein said weakening regions are separated by a rigid region, wherein said rigid region has an axial deformation resistance greater than that of each of the first and second weakening regions.

3. The tolerance absorber sleeve according to claim 1, wherein said tolerance absorber sleeve comprises an abutment flange at the second axial end portion and a securing section, wherein said securing section extends axially from said abutment flange, and wherein said securing section is configured to act as a blind rivet.

4. The tolerance absorber sleeve according to claim 3, wherein said securing section comprises a further weakening zone and a threaded section on the interior surface of said securing section, wherein said threaded section is adapted to be engaged by a threaded member and subsequently pulled towards the second component, whereby said sleeve is partially deformed forming a third radially outward projection, such that the sleeve is secured to the second component by means of the abutment flange and said third radially outward projection.

5. A tolerance absorber assembly comprising a tolerance absorber sleeve and a first and second component, wherein said sleeve is made of a metallic material and comprises a wall and a first axial end portion and a second axial end portion and said wall comprises at least one weakening zone, wherein said weakening zone extends along a circumference of said sleeve, wherein said weakening zone comprises at least one perforation, wherein said tolerance absorber sleeve is arranged in a hole of said first component and abutting said second component at said second axial end portion of the sleeve, and wherein the weakening zone comprises a first radially outward projection on a first side of said first component and a second radially outward projection on a second side of said first component, wherein said first and second radially outward projections are formed by plastic deformation of said weakening zone, wherein said first and second radially outward projections hold said first component within a predetermined tolerance range (D) from said second component.

6. The tolerance absorber assembly according to claim 5, wherein said assembly further comprises a threaded fastener, wherein said threaded fastener comprises:

a bolt, which is threadingly engaged with a threaded opening on said second component or with a nut located on the opposite side of the second component, or a nut, which is threadingly engaged with a threaded stud arranged on said second component, whereby said sleeve is fastened to said second component by said threaded fastener.

7. The tolerance absorber assembly according to claim 6, wherein said threaded fastener is a bolt, and wherein a shaft of said bolt has an outer dimension essentially equal to the smallest inner dimension of said sleeve, whereby the forming of said radially outwards projections in an outward direction is promoted.

8. The tolerance absorber assembly according to claim 5, wherein said tolerance absorber sleeve comprises an abutment flange at the second axial end portion of the sleeve abutting the second component and a securing section, wherein said second component comprises a through-hole, and wherein said securing section extends axially from said abutment flange through said through-hole and is configured to act as a blind rivet.

9. The tolerance absorber assembly according to claim 7, wherein said first component is held tightly by said first and second radially outward projections.

10. The tolerance absorber assembly according to claim 9, wherein the hole of said first component has a cross section substantially corresponding to the cross section of the tolerance absorber sleeve at the weakening zone.

11. The tolerance absorber assembly according to claim 10, wherein the inner circumferential surface of said hole of said first component is bevelled, convex or tapered.

12. A vehicle comprising the tolerance absorber assembly according to claim 5.

13. The tolerance absorber assembly according to claim 5, wherein said first component is held tightly by said first and second radially outward projections.

14. The tolerance absorber assembly according to claim 5, wherein the hole of said first component has a cross section substantially corresponding to the cross section of the tolerance absorber sleeve at the weakening zone.

15. The tolerance absorber assembly according to claim 5, wherein the inner circumferential surface of said hole of said first component is bevelled, convex or tapered.

16. A method for fastening a first component to a second component within a predetermined tolerance range (D) using a tolerance absorber sleeve and a threaded member, wherein said tolerance absorber sleeve comprises a wall and a first and a second axial end portion, wherein said wall has a weakening zone arranged to plastically deform upon axial compression of said sleeve, wherein said weakening zone extends along a circumference of said sleeve, and wherein said weakening zone comprises at least one perforation , wherein said method comprises:

arranging said first and second components within the predetermined tolerance range (D) from each other, arranging said tolerance absorber sleeve in a hole of said first component and abutting said second component, securing said tolerance absorber sleeve to said second component using said threaded member, and compressing said tolerance absorber sleeve using said threaded member, whereby a first radially outward projection is formed on a first side of said hole of said first component, and a second radially outward projection is formed on a second side of said hole of said first component.

* * * * *